(12) United States Patent
Goetzinger et al.

(10) Patent No.: US 7,921,868 B2
(45) Date of Patent: Apr. 12, 2011

(54) AIRING AND VENTING ELEMENTS FOR PIPES AND FITTINGS

(75) Inventors: Stefan Goetzinger, Ainring (DE); Helmut Grassl, Traunstein (DE)

(73) Assignee: HAWLE Armaturen GmbH, Freilassing (DE)

( * ) Notice: Subject to any disclaimer, the term of this patent is extended or adjusted under 35 U.S.C. 154(b) by 480 days.

(21) Appl. No.: 12/061,100

(22) Filed: Apr. 2, 2008

(65) Prior Publication Data

US 2008/0276994 A1 Nov. 13, 2008

(30) Foreign Application Priority Data

May 8, 2007 (EP) ..................................... 07009225

(51) Int. Cl.
*F16K 24/04* (2006.01)
(52) U.S. Cl. ........ 137/202; 137/218; 137/411; 137/430; 137/625.28; 251/901
(58) Field of Classification Search .................. 137/218, 137/625.28, 39, 43, 202, 411, 429, 430, 628, 137/629, 630, 630.14, 630.15, 630.16; 251/901
See application file for complete search history.

(56) References Cited

U.S. PATENT DOCUMENTS

| | | | | |
|---|---|---|---|---|
| 2,977,972 A * | 4/1961 | Henry et al. | ................... | 137/202 |
| 3,259,142 A * | 7/1966 | Richards | ........................ | 137/202 |
| 3,618,629 A * | 11/1971 | Heyer et al. | ..................... | 137/218 |
| 3,741,234 A * | 6/1973 | Siebold | .......................... | 137/202 |
| 4,306,580 A * | 12/1981 | Wallquist et al. | .............. | 251/901 |
| 4,488,702 A * | 12/1984 | Lapeyre | ......................... | 251/901 |
| 4,552,177 A * | 11/1985 | Lapeyre | ................... | 137/625.28 |
| 4,708,157 A * | 11/1987 | Sabatino | ........................ | 251/901 |
| 6,712,090 B1 * | 3/2004 | Brandelli | ....................... | 137/414 |
| 6,779,544 B2 * | 8/2004 | Devall | ............................ | 137/202 |
| 6,782,911 B2 * | 8/2004 | DeCapua et al. | .............. | 137/202 |

FOREIGN PATENT DOCUMENTS

DE 299 05 743 U1 7/1999
DE 299 18 722 U1 3/2000

* cited by examiner

*Primary Examiner* — John Rivell
*Assistant Examiner* — Craig Price
(74) *Attorney, Agent, or Firm* — RatnerPrestia

(57) ABSTRACT

The invention relates to an airing and venting valve for pipes and fittings carrying fluid, comprising a substantially cup-shaped valve body becoming smaller in cross-section towards the bottom for closing and opening a valve outlet, with a seal cup co-operating with a float of the valve, and a cup seal which is disposed between the valve body and seal cup and is able to move into different closing and opening positions lying across passage orifices of the valve body. By virtue of one aspect of the invention, the seal cup has an internal contour which becomes wider towards the top conforming to the external contour of the valve body. By virtue of another aspect, the valve body is disposed so that it is able to move against its seat at the valve outlet so that it can release and close a passage in the region of the valve body seat.

13 Claims, 3 Drawing Sheets

AIRING AND VENTING ELEMENTS FOR PIPES AND FITTINGS

FIELD OF THE INVENTION

The invention relates to an airing and venting valve for pipes and fittings. Such airing and venting valves are used as a means of airing and/or venting pipes carrying a medium, in particular pipes placed under pressure and especially drinking water or waste water pipes. They may be disposed at geodetic high points, in the pipes themselves or on fittings in the pipe system.

BACKGROUND

Airing and venting valves with seating seals are known, for example of the type whereby an actual float on a seal seating provides the sealing effect. Documents DE 299 05 743 U1 and DE 299 18 722 U1 also disclose airing and venting valves comprising a valve body, a seal cup and a cup seal disposed in between, and the proposed valve body is of a frustoconical design tapering towards the bottom, whilst the seal cup has a cylindrical internal shape. The disadvantages of these known valves are that their venting power is limited by the restricted end-to-end cross-section of the radially disposed valve body orifices and the cup seal is more susceptible to forces which could tear it off in the closed position, which necessarily requires the use of use heavier floats which therefore have a poorer buoyancy. In order to overcome these problems, the floats must be made bigger in order to create the ideal lifting and gravitational forces, which in turn leads to the problem of having to make the valves bigger.

BRIEF DESCRIPTION

The present invention is an airing and venting valve, which overcomes at least some of the problems outlined above. In particular, the intention is to improve the venting function and/or venting capacity.

By virtue of one aspect of this invention, an airing and venting valve for pipes or fittings carrying fluid is proposed, with an essentially cup-shaped valve body which becomes smaller in cross-section towards the bottom for closing an opening a valve outlet, a seal cup co-operating with a float of the valve and a cup seal which is disposed between the valve body and seal cup and is able to move into different closing and opening positions lying across passage orifices of the valve body. The seal body has an internal contour which becomes wider towards the top, essentially conforming to the external contour of the valve body.

In other words, the seal cup co-operating with the valve body also has a cross-section which varies in its interior across its axial length and does so due to a cross-section which tapers towards the bottom. This design ensures that sufficient space is provided for the cup seal and prevents any jamming in the closed position when the seal cup is seated over the bottom part of the valve body and the cup seal is covering the passage orifices. This in turn means that on opening, the cup seal moves away more easily, thereby enabling a lighter float to be used. On the one hand, a lighter float of this type offers better buoyancy, which ensures a more reliable and faster closure of the valve, and on the other hand, a smaller one may be used, thereby keeping the size of the valve smaller overall.

The valve body may be of an essentially frustoconical shape at the bottom and in one embodiment of the invention, the same also applies to the internal contour of the seal cup, which may have an essentially conical and in particular frustoconical shape.

In one embodiment, the seal cup is of a depth and width which ensure that when it is in the position in which it sits fully over the valve body, it comes into contact with the valve body solely by means of its top edge and via the cup seal. In other words, the seal cup is therefore deeper and wider than the external shape of the valve body, which offers an even more reliable way of preventing the seal from jamming. It is also of advantage if the cup seal is attached to the external face of the seal cup at a distance from its top edge because this means that the point of attachment of the seal is no longer directly subjected to forces, for example clamping forces, due to the contact between the valve body and seal cup.

By virtue of another aspect, this invention relates to an airing and venting valve for pipes and fittings carrying fluid, with an essentially cup-shaped valve body which becomes smaller in cross-section towards the bottom for closing and opening the valve outlet, with a seal cup co-operating with a float of the valve, and a cup seal which is disposed between the valve body and seal cup and is able to move into different closing and opening positions lying across passage orifices of the valve body. In this case, the valve body is able to move against its seat at the valve outlet, thereby releasing and closing a passage in the region of the valve body seat. An airing and venting valve of this design may also incorporate the features outlined above.

In other words, as a result of this aspect of the invention and especially in the case of airing and venting valves of a small design, a valve body that is separated or separate from the valve outlet is provided and the fact that a passage can be provided between the valve body and the valve outlet as a result makes it possible to provide a large passage cross-section, such as needed for more rapid airing and venting. Using this option in conjunction with providing a cup seal permits a twofold or two-stage opening of the valve. Accordingly, in the fully open position, in addition to the radially disposed orifices in the valve body, another large orifice in the seat of the valve body can be opened, causing the air to escape quickly, which enables pipes and hollow bodies in the system to be filled more rapidly and with less pressure. The advantages of the rapid throughput of air through the correspondingly large orifice naturally have a knock-on effect on the process of filling the valve with air. The valve reacts very quickly to sudden or high negative pressures in the pipe system. Such a two-stage system may be designed so that the large orifice between the valve body and valve outlet close first of all when the valve moves into the closing position, after which the stepless adjustment of the venting is effected with the aid of the cup seal.

The valve body may also be disposed so that it can move downwards away from its seat, although in principle other solutions would also be conceivable, for example based on rotating mechanisms or combined rotating and translating movements.

The valve body preferably has an inner, in particular central, guide portion, by means of which it is guided in a guide or in the valve outlet. This opening stage can be controlled particularly efficiently as a result. Especially in terms of its other fixing means in the venting valve, the valve body may be disposed on a float guide stem, in particular on the top part of the guide stem, where it is preferably secured at the centre.

Another option is to fit the cup seal on the bottom external face of the valve body and use it as a pulling means which moves the valve body away from its seat when the float or the seal cup with the cup seal attached to its other end moves downwards. This automates the two-stage aspect of the opening and closing procedure.

The two-stage or twofold closing and opening of the valve is effectively controlled by the driving force induced by the internal pressure in the valve body, although another option would be to incorporate a spring mechanism between the valve body and the valve outlet which assists the closing action, namely by biasing the valve body towards the valve body seat.

DRAWINGS

The invention will be explained in more detail below with reference to embodiments. It may incorporate all of the described features, individually and in any practical combination. Of the appended drawings.

DETAILED DESCRIPTION

Figure 1:
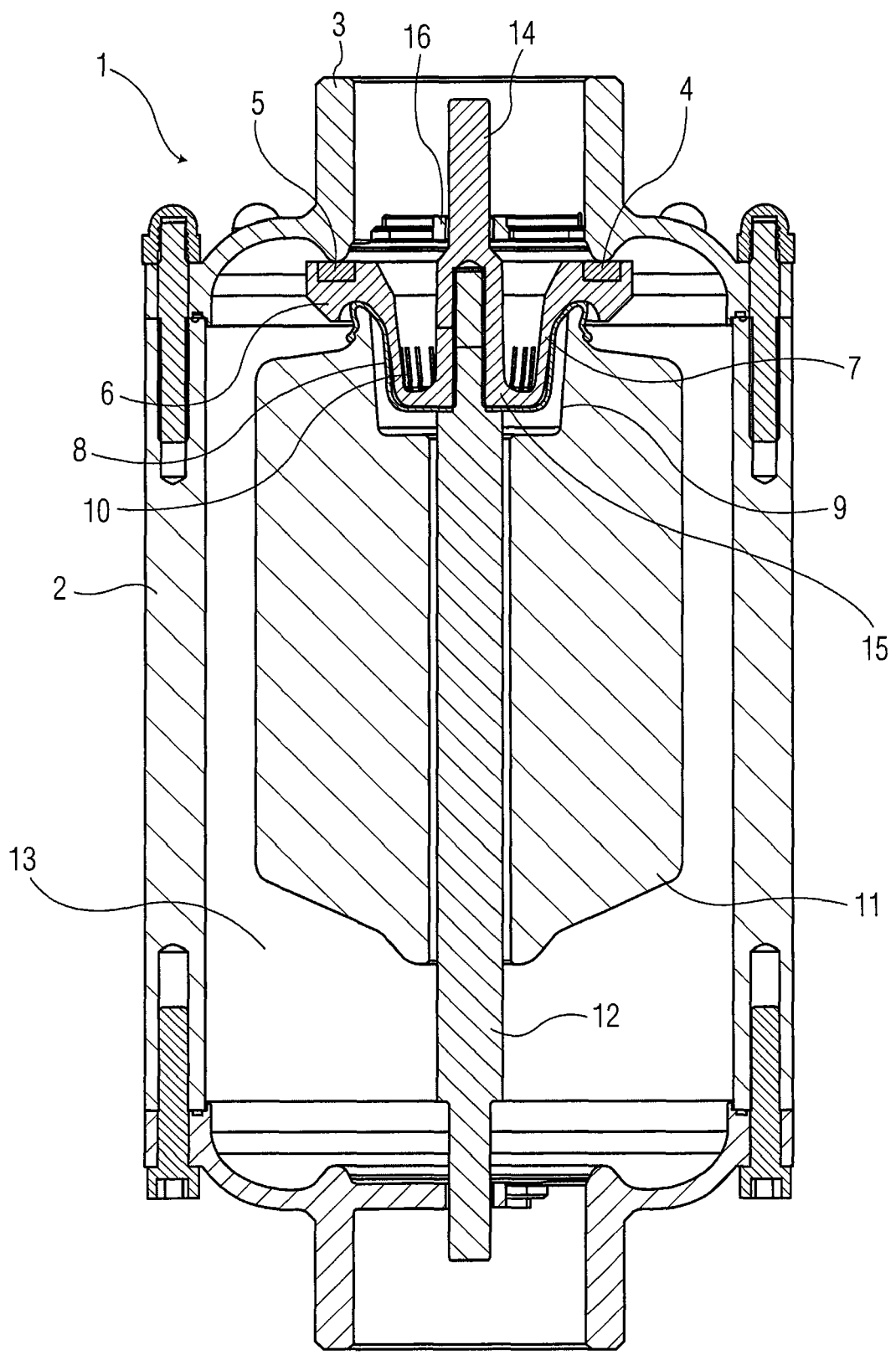
FIG. 1 is a diagram in section illustrating an airing and venting valve proposed by the invention in the fully closed state.

The components of the airing and venting valve proposed by the invention are provided with reference numbers in FIG. 1 and the actual valve itself as a whole is denoted by reference number 1. It has a valve housing 2 comprising a cover at the top and the upwardly projecting valve outlet 3. At its bottom edge, the valve outlet 3 has an outwardly curved valve body seat 4 and, in the fully closed position illustrated in FIG. 1, a valve body 6 sits with an axial seal 5 lying against the valve body seat 4 so that no fluid is able to flow between these components.

The valve body 6 is of an essentially cup-shaped design and has a downwardly tapering external contour 7 of a frustoconical shape, in which passage orifices 10 are provided, in this instance in the form of elongate slots distributed around the periphery.

In its middle part, the valve body 6 has an upwardly projecting extension with a bottom part 15 and a top part 14. The bottom part 15 is a part of the valve body, whilst the top portion 14 is a separate part and is used to guide the valve body in a guide bearing 16 mounted on the inside of the valve outlet 3. At the other end, screwed into portions 15 and into the bottom hollow part of the portion 14, is the extension of a float guide stem 12, which is turn mounted in the housing at the bottom. Together with the guide stem 12 and the top portion 14, therefore, the valve body 6 is able to move out of the position illustrated in FIG. 1 guided downwards only in a straight line.

The float 11, likewise able to move upwards on the displaceably mounted float guide stem 12, has a recess in its top region denoted by reference number 9 which constitutes the seal cup, where the seal cup is coaxially aligned with the float and moves along with the float. The seal cup has an upwardly projecting ridge and the cup seal 8 is secured to the external face of this ridge, from where it extends down across the external contour 7 of the valve body 6 and thus closes the passage orifices 10.

The state illustrated in FIG. 1 occurs when a relatively high fluid level prevails in the interior 13 of the housing 2. This being the case, the top edge of the float pushes the cup seal 8 against the bottom, arcuate recess of the valve body on the one hand, and the cup seal is pressed against the orifices 10 by the internal pressure and closes them, on the other hand. Due to the upwardly expended force of the float 11, the gap between the seal 5 and the valve body seat 4 is also closed.

Figure 2:
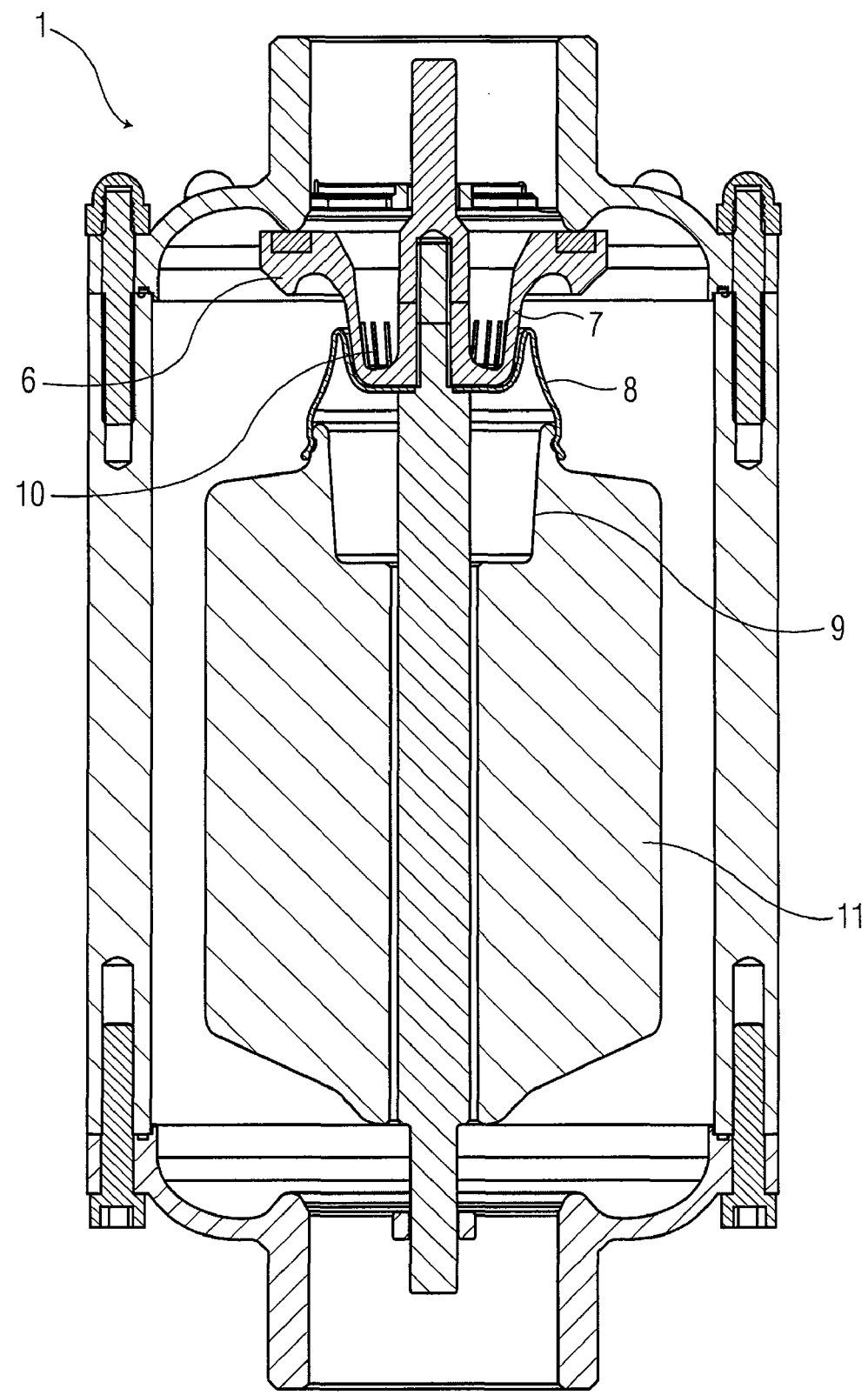
FIG. 2 shows the valve illustrated in FIG. 1 in the operating mode assumed during venting by the cup seal.

When the fluid level in the housing drops, the float 11 moves down due to gravitational force and the valve switches to the state illustrated in FIG. 2. The cup seal 8 is pulled downwards due to the fact that it is attached to the outside of the seal cup 9 and rolls down the external contour 7 of the valve body, thereby gradually and steplessly releasing the passage orifices 10 so that air is able to pass through. The cup seal 8 opens to a greater or lesser degree depending on the quantity of air flowing into the valve.

Figure 3:
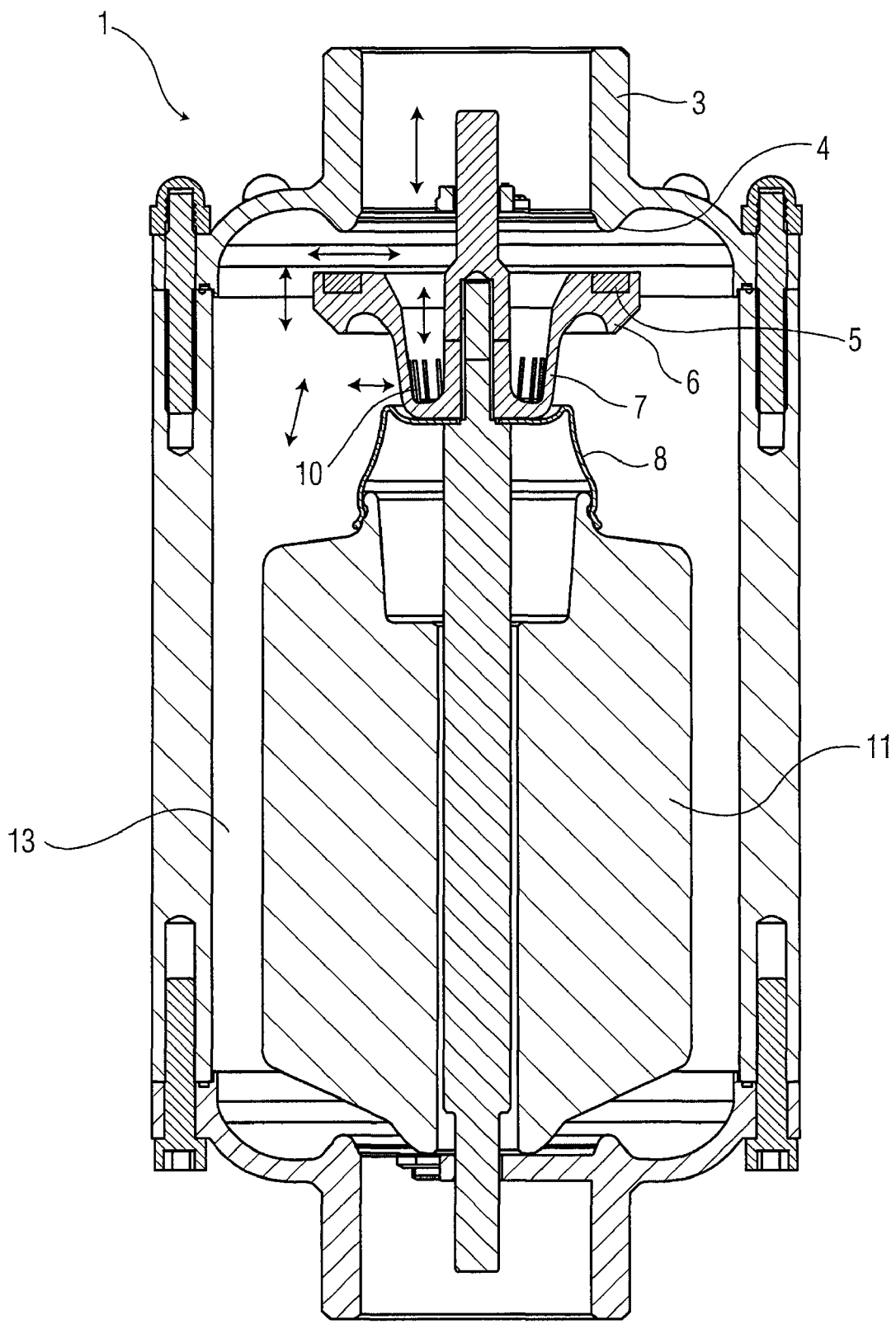
FIG. 3 shows the valve illustrated in FIG. 1 in the fully open state.

When the housing is largely empty so that the entire weight of the float 11 together with the seal cup 9 is bearing down and the force of the weight of the float 11 with the seal cup 9 is stronger than the pressing force generated by the internal pressure, the second valve stage opens, i.e. the valve body 6 releases itself from the valve body seat 4. Another, larger venting cross-section is released as a result and the air is able to flow anywhere indicated by arrows in FIG. 3, namely through the gap between the valve body 6 and valve body seat 4 and through the passage orifices 10 which are no longer covered by the cup seal 8. The valve body 6 is guided (at the top in the outlet 3 and at the bottom in the housing), moving upwards and downwards only, as mentioned above.

As water now flows into the housing interior 13, it lifts the float 11 together with the seal cup 5 and as the internal pressure rises, the valve body 6 is pushed upwards with its seal 5 against the seat 4. During this operation, the gap between the valve body 6 and the valve body seat 4 can be vented very quickly. To provide even better safety with regard to the sealing effect in the low pressure range, a tension spring may also be incorporated between the outlet 3 and the valve body 5.

Once the valve body 6 has made contact with its seat 4 again and is affording a sealing function, the cup seal 8 is able to effect the stepless venting process again by rolling across the valve body external contour 7 and releasing the radially disposed passage orifices 10 to a greater or lesser degree. The valve will therefore return from the state illustrated in FIG. 3 as the water rises in the housing, passing via a state illustrated in FIG. 2 and back into the state illustrated in FIG. 1, automatically providing stepless venting between the stages illustrated in FIGS. 1 and 3.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

The invention claimed is:

1. An airing and venting valve for pipes and fittings carry fluid, compromising:
   a substantially cup-shaped valve body becoming smaller in cross-section towards the bottom for closing and opening a valve outlet;
   a seal cup co-operating with a float of the valve, the seal cup being coaxially aligned with the float and moves with the float; and
   a cup seal which is disposed between the valve body and the seal cup and is adapted to move into different closing or opening positions lying across passage orifices of the valve body;

wherein the seal cup has an internal contour which becomes wider towards the top, substantially conforming to the external contour of the valve body.

2. The airing and venting valve as claimed in claim 1, wherein the valve body has a substantially frustoconical shape.

3. The airing and venting valve as claimed in claim 1, wherein the internal contour of the seal cup is essentially of a conical, in particular frustoconical shape.

4. The airing and venting valve as claimed in claim 1, wherein the seal cup has a depth and width which ensure that, in the position in which it sits completely over the valve body, the valve body contacts the cup seal solely by means of a top edge of the float via the cup seal.

5. The airing and venting valve as claimed in claim 1, wherein the cup seal is secured to an external face of the seal cup at a predetermined distance from its top edge.

6. The airing and venting valve as claimed in claim 2, wherein the internal contour of the seal cup is essentially of a conical, in particular frustoconical shape.

7. An airing and venting valve for pipes and fittings carrying fluids, comprising:
   a substantially cup-shaped valve body becoming smaller in cross-section towards the bottom for closing and opening a valve outlet;
   a seal cup co-operating with a float of the valve, the seal cup being coaxially aligned with the float and moves along with the float; and
   a cup seal which is disposed between the valve body and the seal cup and is able to move into different closing or opening positions lying across passage orifices of the valve body,
   wherein the valve body is disposed so that it can move against a seat at the valve outlet and is thus able to release and close a passage in the region of the valve body seat.

8. The airing and venting valve as claimed in claim 7, wherein the valve body is disposed so that it can move downwards away from the seat.

9. The airing and venting valve as claimed in claim 8, wherein the valve body has an inner, in particular central, guide portion by means of which it is guided in a guide on or in the valve outlet.

10. The airing and venting valve as claimed in claim 7, wherein the valve body has an inner, in particular central, guide portion by means of which it is guided in a guide on or in the valve outlet.

11. The airing and venting valve as claimed in claim 7, wherein the valve body is disposed on a float guide stem, in particular is attached centrally to the top part of the guide stem.

12. The airing and venting valve as claimed in claim 7, wherein the valve body has an axial seal in the region of its contact point with the seat.

13. The airing and venting valve as claimed in claim 7, wherein the cup seal is attached to a bottom external face of the valve body and serves as a pulling means which moves the valve body away from its seat when the float and the seal cup with the cup seal secured to the other end moves downwards.

* * * * *

UNITED STATES PATENT AND TRADEMARK OFFICE
CERTIFICATE OF CORRECTION

| | | |
|---|---|---|
| PATENT NO. | : 7,921,868 B2 | Page 1 of 1 |
| APPLICATION NO. | : 12/061100 | |
| DATED | : April 12, 2011 | |
| INVENTOR(S) | : Stefan Goetzinger and Helmut Grassl | |

It is certified that error appears in the above-identified patent and that said Letters Patent is hereby corrected as shown below:

On the Title Page, item [30], Foreign Application Priority Data: "07009225" should read --07009225.9--.

Signed and Sealed this
Fifth Day of July, 2011

David J. Kappos
*Director of the United States Patent and Trademark Office*